United States Patent [19]
Shaffner

[11] Patent Number: 6,024,664
[45] Date of Patent: Feb. 15, 2000

[54] NONVARIABLE OR CONTINUOUSLY VARIABLE FRICTION DRIVE

[76] Inventor: Richard F. Shaffner, 3038 Ferncliff Rd., Charlotte, N.C. 28211

[21] Appl. No.: 09/064,382

[22] Filed: Apr. 22, 1998

[51] Int. Cl.[7] .................................................. F16H 15/48
[52] U.S. Cl. ........................... 475/185; 475/193; 475/170
[58] Field of Search ................................... 475/343, 183, 475/185, 193, 194, 170, 169

[56] References Cited

U.S. PATENT DOCUMENTS

| | | | |
|---|---|---|---|
| 537,977 | 4/1895 | Hult | 475/183 |
| 2,837,937 | 6/1958 | Kraus . | |
| 3,224,300 | 12/1965 | Chery | 475/194 |
| 3,324,746 | 6/1967 | Kari . | |
| 3,442,158 | 5/1969 | Marcus . | |
| 3,475,993 | 11/1969 | Hewko | 475/183 |
| 4,424,726 | 1/1984 | Galbraith . | |
| 4,505,163 | 3/1985 | Falkner . | |
| 4,920,827 | 5/1990 | Takamiya et al. . | |
| 4,924,730 | 5/1990 | Parsons . | |
| 4,995,279 | 2/1991 | Parsons . | |
| 5,013,288 | 5/1991 | Parsons . | |
| 5,037,361 | 8/1991 | Takahashi | 475/183 X |
| 5,071,393 | 12/1991 | Genovese . | |
| 5,145,468 | 9/1992 | Nagabhusan . | |
| 5,545,100 | 8/1996 | Roovers et al. . | |
| 5,577,975 | 11/1996 | Kitugawa . | |
| 5,688,201 | 11/1997 | Zhou | 475/183 |

FOREIGN PATENT DOCUMENTS

| | | | |
|---|---|---|---|
| 180346 | 7/1990 | Japan | 475/183 |
| 153947 | 7/1991 | Japan | 475/183 |
| 4347 | 1/1992 | Japan | 475/183 |
| 4210149 | 7/1992 | Japan | 475/183 |
| 449190 | 11/1974 | U.S.S.R. | 475/183 |

OTHER PUBLICATIONS

Paul Grafstein and Otto B. Schwarz, "Pictorial Handbook of Technical Devices", 1971, pp. 73, 87 and 125.
Michael A. Kluger and Douglas R. Fussner, "An Overview of Current CVT Mechanisms, Forces and Efficiencies", 1997, pp. 81–88.
Kobayashi et al, "A Study on the Torque Capacity of a Metal Pushing V–Belt for CVTs", 1998 Society of Automotive Engineers, Inc., pp. 31–39.
Nicholas P. Chironis and Neil Sclater, "Mechanisms & Mechanical Devices Sourcebook", pp. 225–227.

*Primary Examiner*—Charles A. Marmor
*Assistant Examiner*—Ha Ho
*Attorney, Agent, or Firm*—Alston & Bird LLP

[57] ABSTRACT

A double-eccentric friction drive having a natural and automatic friction-increasing effect under load includes a friction ring and a wheel which is located eccentrically with respect to the friction ring, and a hollow cylindrical or ring-shaped wedged member that is eccentric relative to the wheel and the friction ring and whose side wall is held against the friction ring by the wheel. In continuously variable embodiments of the friction drive, one or more of the three members comprises a pair of spaced-apart halves whose spacing from each other is infinitely adjustable, and one or more of the members includes tapered surfaces which coact with the movable halves so as to effectively vary the diameters of contact surfaces between the members. The eccentricity of the wheel is infinitely adjustable in harmony with the movable halves to constantly urge the wedged member against the friction ring, whereby the ratio of an input speed to an output speed of the drive is infinitely adjustable.

28 Claims, 9 Drawing Sheets

_Fig.4._

_Fig.5._

_Fig.6._

_Fig.7._

NONVARIABLE OR CONTINUOUSLY VARIABLE FRICTION DRIVE

FIELD OF THE INVENTION

The present invention relates to friction drives and, more particularly, to nonvariable or continuously variable friction drives having improved resistance to slippage.

BACKGROUND OF THE INVENTION

Friction drives are used in a variety of applications for converting a rotational input motion into a rotational output motion at a fixed or variable ratio. Power is transmitted through a friction drive via friction forces generated between two or more rotating components, and hence friction drives are effective only when there is essentially no slippage between the components. A limitation of all friction drives is that the friction force can be overcome at high loads, resulting in slippage. Since the coefficient of sliding friction is always less than the coefficient of static friction, once slippage starts to occur, a no-slip condition can be re-established only by either reducing the power input to the device until the transmitted force is less than the frictional force, or increasing the normal force between the components to increase the friction force above the transmitted force. However, reducing the power input is not desirable or feasible in many cases. Furthermore, increasing the normal force requires either constantly increasing the normal force across all use regimes, for instance by applying a preload force which acts between the components at all times, or sensing or anticipating when a slip occurs and temporarily increasing the normal force imparted on the rotating components. Both of these approaches have disadvantages. Constantly increasing the normal force results in increased rolling resistance, and hence decreased efficiency of the drive, even in low-load conditions where the increased normal force is not needed. Temporarily increasing the normal force requires additional equipment for sensing when a slip occurs or for making measurements of operating conditions and determining when a slip is likely to occur, as well as equipment for varying the normal force, resulting in greater complexity and increased cost of the friction drive.

Friction drives which naturally and automatically increase the friction force when the transmitted power increases have been developed as a means of delaying the onset of slippage to higher-load conditions. An example of such a drive is the V-belt transmission which is in use in the automotive field. The V-belt transmission employs flexible belts having a V-shaped cross-section and pulleys that have similarly V-shaped tracks within which the belts travel. Increasing load causes the belt to become more firmly wedged in the tracks so as to increase the frictional forces on the belt. Continuously variable transmissions (CVTs) employing the V-belt technology have been developed, including the Van Doorne transmission which employs pulleys having sheaves that are movable toward and away from each other for continuously varying the effective diameters of the pulleys so as to continuously vary an input-to-output speed ratio of the transmission.

However, a significant drawback of the V-belt design is that the belts tend to stretch and deform and undergo other physical changes which compromise the load-handling ability of the transmission. Transmission designers have attempted to overcome these problems of the V-belt transmission by developing a metal V-belt or chain which offers increased strength over rubber V-belts, and which transmits torque mainly via compressive forces acting between the metal links of the chain. However, an unfortunate characteristic of the metal V-belt is that slippage occurs between the metal links and the pulleys, and this slippage tends to increase sharply once the transmitted torque exceeds a certain value which is a function of the pulley clamping force on the belt. Thus, the problem of V-belt deformation has not been solved without also sacrificing one of the most important benefits of the V-belt design, namely, its natural friction-increasing characteristic.

No known friction-based CVT has been developed which has a natural and automatic tendency to increase the friction force when the input power and/or the load imposed on the output increases, and which does not require the use of relatively non-durable belts or the like.

SUMMARY OF THE INVENTION

The present invention overcomes the drawbacks associated with prior friction drives noted above, by providing a double-eccentric friction drive of relatively simple construction which has a natural and automatic tendency to increase the friction force between the key components when the input power and/or the load imposed on the output increases, and which achieves its friction-increasing characteristic without belts or other highly flexible and non-durable components. The friction drive is capable of transmitting high levels of torque. Furthermore, the friction drive of the present invention is readily adaptable to a continuously variable form.

To these ends, the double-eccentric friction drive in accordance with a first preferred embodiment of the invention comprises a friction ring having an inner circular surface, and a wedged member which has concentric inner and outer circumferences and which is in rolling contact with the friction ring inner surface. A rotatable wheel having a circular outer surface is disposed within the wedged member and is biased against the inner surface of the wedged member so as to force the wedged member against the inner surface of the friction ring. The wheel is held to be eccentric relative to the friction ring, and is also eccentric relative to the wedged member. The friction ring may be either non-rotating or rotatable about its center.

Where the friction ring is non-rotating, the wheel is orbitally driven about the center or axis of the friction ring, and preferably is freely rotatable about its own axis. Accordingly, the wedged member is orbitally driven about the center of the friction ring by virtue of the contact of the wheel with the inner surface of the wedged member. A sufficient force is imposed by the wheel on the wedged member to keep the wedged member in contact with the friction ring so that the wedged member rolls along the inner surface of the ring. The wedged member is thus forced to roll along the inner surface of the friction ring, and accordingly the wedged member also rotates about its center. This rotation of the wedged member about its center forms the output of the friction drive.

The double-eccentric friction drive has a natural tendency to increase the friction force between the wedged member and the friction ring when the power applied through the wheel increases and/or the load imposed on the wedged member increases, and therefore the preload force on the wheel against the wedged member need not be a large force. More specifically, the center of the wheel and the center of the friction ring define a radial line, and the center of the wedged member lies generally on this line, as do the contact points between the wedged member outer surface and the friction ring inner surface and between the wedged member inner surface and the outer surface of the wheel. However, at high-load conditions when high torque loads are exerted on the wedged member, the wedged member will tend to lag the wheel so that its center moves laterally off the radial line. When this occurs, the wheel automatically imparts an increased normal force to the wedged member in the direction against the friction ring because the outer surface of the wheel traverses a circular path about the center of the friction ring which is of greater radius than the radius of the inner surface of the wedged member. Thus, the wedged member acts like a wedge of increasing thickness in the direction of movement of the wheel. Since the wheel is constrained to follow its eccentric orbit, it imposes an increased force on the wedged member tending to force the wedged member more firmly against the friction ring, thereby reducing the likelihood of slippage.

In a continuously variable embodiment of the friction drive, the friction ring comprises a pair of spaced-apart ring halves which are movable to vary the spacing therebetween, and one or both of the wedged member and the ring halves include tapered or inclined surfaces such that the effective diameter of the wedged member (i.e., the diameter of the contact surfaces of the wedged member where they contact the ring halves) varies with the spacing between the ring halves. The eccentricity of the wheel is varied in accordance with the spacing between the ring halves so that the orbiting wheel always keeps the wedged member in contact with the ring halves. Thus, by varying the spacing of the ring halves, the ratio of input speed to output speed may be continuously varied. The drive advantageously is adapted to be placed in a "geared neutral" setting in which no output rotation is transmitted through the output member for any input rotational speed imposed on the drive.

Alternatively, the ring halves (or two spaced-apart portions of a one-piece ring) may be spaced apart with a fixed spacing, and the wedged member may have movable surfaces which engage the ring halves or portions and which are variably spaced apart for varying the speed ratio of the friction drive.

The drive described above, in which the wheel is disposed on the inside of the friction ring or ring halves, is referred to herein as a "hypocyclic" drive. The non-variable or continuously variable friction drive of the invention may be alternatively configured as an "epicyclic" drive in which the wheel is disposed outside the friction ring or ring halves. Thus, in another embodiment of the invention, the wheel is orbitally driven about the outer surface of the wedged member, and the friction ring is disposed inside the wedged member so that the inner surface of the wedged member contacts the outer surface of the friction ring.

The non-variable or continuously variable hypocyclic or epicyclic friction drive may further be alternatively configured as a non-orbital drive. In accordance with this aspect of the invention, the friction drive includes a friction ring, or a ring comprising ring halves, which is rotatable about its center. The wheel is not orbitally driven, but is rotatable about its center. Either the wheel, friction ring (or ring halves), or the wedged member comprises an input member which is rotatably driven about its center, and one of the other two components comprises an output member which rotates about its center.

The invention also encompasses a double-eccentric friction drive in combination with an eccentric constant velocity joint for transmitting the motion of the drive's output component to an output shaft. The eccentric constant velocity joint comprises a pair of ring gears having internal or external toothed circumferences, and a transfer gear having a toothed circular outer surface which meshes with the toothed circumferences of both ring gears. Preferably, the circumferences of the ring gears are identical in diameter and having identical gear teeth. One of the ring gears comprises an input gear which is coupled to an output component of the friction drive, such as the wedged member. The input ring gear is constrained to orbit about the center of the other ring gear, which comprises an output gear. The output ring gear advantageously is coaxially aligned with the friction ring of the drive. The transfer gear is constrained to remain meshed with both ring gears. Accordingly, where the friction drive is an orbital drive, orbital motion of the wedged member causes the input ring gear to orbit about the center of the output ring gear, which causes the transfer gear to orbit and roll around both ring gears. This orbital motion of the transfer gear causes it to rotate about its center at an orbit-induced rate.

If the input ring gear is not rotating as it orbits about the center of the output ring gear, then rotation of the transfer gear will remain at its base orbit-induced rate, and no rotation will be imparted on the output gear. However, if the input gear is rotating about its center as it orbits, then the rotation of the transfer gear will be increased or decreased from its base orbit-induced rate. As the transfer gear orbits and rolls about the output gear, it transfers this differential rotational motion to the output gear. Thus, the orbital motion of the input gear is nullified, and the transfer gear gives the output gear the same rotational motion as the input gear.

The invention thus provides a non-variable or continuously variable friction drive which achieves a natural and automatic friction-increasing effect under increased load, and which does so without the use of belts or other non-durable components. The drive can be made to be continuously variable over a wide range. Additionally, the drive can be made to have a geared neutral capability such that no clutches are required for achieving a neutral setting.

BRIEF DESCRIPTION OF THE DRAWINGS

Additional objects, features, and advantages of the invention will become apparent from the following description of particular embodiments thereof, when taken in conjunction with the accompanying drawings in which.

DETAILED DESCRIPTION OF THE DRAWINGS

Figure 1:
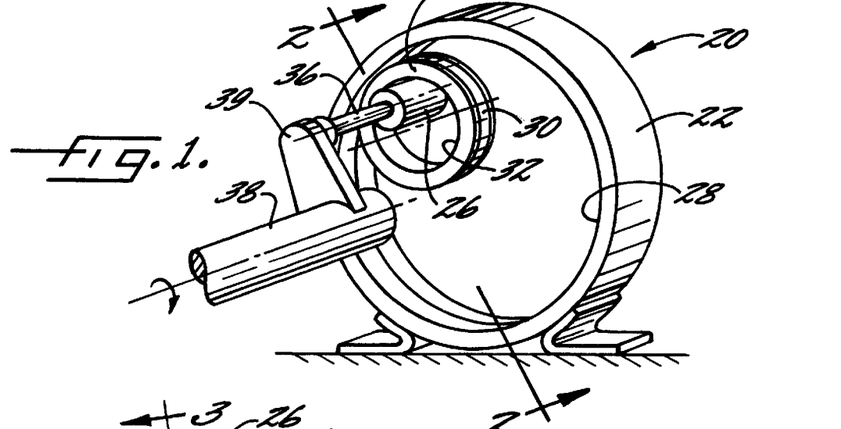
FIG. 1 is a perspective view of an embodiment of a hypocyclic, non-variable, orbital friction drive in accordance with the invention.
Figure 2:
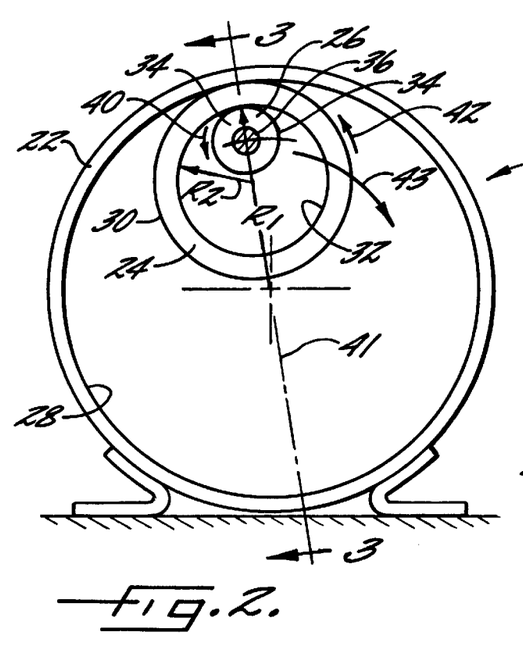
FIG. 2 is a cross-sectional view taken on line 2—2 of FIG. 1.
Figure 3:
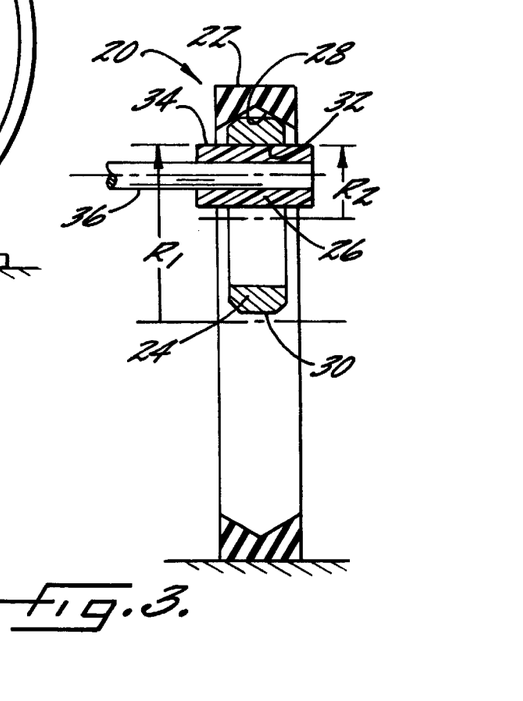
FIG. 3 is a cross-sectional view taken on line 3—3 of FIG. 2.

With reference to FIGS. 1–3, a non-variable hypocyclic double-eccentric friction drive 20 in accordance with the invention is shown. The drive 20 comprises three primary components: an outer friction ring 22, a wedged member 24, and a wheel 26. The friction ring 22 is a circular ring having an inner surface 28. The wedged member 24 is a circular ring or wheel which has a circular outer surface 30 adapted to engage the inner surface 28 of the friction ring 22 and a circular inner surface 32 which is concentric with the outer surface 30. The wheel 26 is a circular generally cylindrical member which has a circular outer surface 34 adapted to engage the inner surface 32 of the wedged member 24.

The friction ring 22 is stationary in the embodiment of the drive 20 of FIGS. 1–3. The wheel 26 is rotatably supported by a suitable member, such as the shaft 36 shown in FIGS. 1–2, such that the wheel 26 freely rotates about its longitudinal axis. The wheel 26 is located inside the wedged member 24 and is spaced radially outward from the center of friction ring 22 such that the outer surface 34 of the wheel 26 forces the wedged member 24 into contact with the inner surface 28 of the friction ring 22. Thus, the wheel 26 is eccentric relative to the friction ring 22, and is also eccentric relative to the wedged member 24.

The wheel 26 is forced to orbit about the center of the friction ring 22 in a suitable manner, such as by means of an input crankshaft 38 having a crank section or arm 39 which supports the shaft 36. Rotation of the crankshaft 38 about its axis, which is coaxially aligned with the center of the friction ring 22, thus causes the shaft 36 to orbit about the center of friction ring 22. The shaft 36 holds the wheel 26 in constant contact with the inner surface 32 of the wedged member 24, so that as the shaft 36 moves along its orbital path, the wedged member 24 is forced to roll along the inner surface 28 of the friction ring 22 by the movement of the wheel 26. The wheel 26 also rolls along the inner surface 32 of the wedged member 24.

Thus, with particular reference to FIG. 2, the wheel 26 moves in an orbital path about the center of the friction ring 22, as indicated by arrow 43. The wheel 26 causes the wedged member 24 to orbit about the center of the friction ring and roll around the inner surface thereof. Accordingly, the wheel 26 rotates about its axis as indicated by arrow 40, and the wedged member 24 rotates about its axis as indicated by arrow 42, both rotations being in the same direction and opposite to the rotational direction of crankshaft 38. It will be appreciated that the ratio of rotational speed of the wedged member 24 about its axis to the rotational speed of the crankshaft 38 will depend on the diameter of the wedged member's outer surface 30 in relation to that of the inner surface 28 of the friction ring 22. For example, if the wedged member 24 has an outer surface equal in diameter to that of the friction ring inner surface, then the wedged member 24 will not orbit about the center of friction ring 22 and consequently will not rotate about its axis. On the other hand, if the wedged member is smaller in diameter than the friction ring inner surface, then it will be forced to orbit and rotate about its axis, and the smaller the diameter of wedged member 24, the faster it will rotate about its axis for a given rotational speed of crankshaft 38.

The friction drive 20 thus may be used for converting a rotary input (the term "rotary" being used herein broadly to denote either an orbital motion of one component about the center of another component, or a rotational motion of a component about its own center, or a combination of an orbital and rotational motion) into an output motion having a rotational component which is faster or slower than the rotary input. For example, if the crankshaft 38 comprises a rotary input, then an output may be taken from the rotation of the wedged member 24 about its axis, and the ratio of input to output speed may be selected by suitably selecting the various component diameters as described above. An output may also be taken from the rotation of the wheel 26 about its axis.

The friction drive 20 provides a significant advantage over prior friction drives, in that the drive has a natural tendency to increase the friction force between the wedged member 24 and the friction ring 22 when the torque applied through the crankshaft 38 increases and/or the load imposed on the wedged member 24 increases. This friction-increasing characteristic is provided by virtue of the force applied to the wedged member 24 being an orbital force about the center of the friction ring 22 as opposed to a rotational force about the center of the wedged member 24. More specifically, and with reference to FIG. 2, the outer surface of the wheel 26 moving in its orbital path circumscribes a circle of radius $R_1$, while the inner surface 32 of the wedged member 24 has a radius $R_2$ which is smaller than $R_1$. Accordingly, if force or torque is applied to the wedged member 24 to resist the force applied by the wheel 26 so as to cause the center of the wedged member to move off the line 41 through the centers of the friction ring 22 and the wheel 26, the inner surface 32 of the wedged member acts as the inclined plane of a wedge. Because the wheel 26 is constrained to follow its orbital path, the wheel 26 therefore imposes an increased force on the wedged member 24 tending to force the wedged member more firmly against the friction ring 22. Accordingly, the friction force between the wedged member 24 and the friction ring 22 is automatically increased, reducing the likelihood of slippage.

The wheel 26 has been described as being orbitally driven about the center of the non-rotating ring 22 which is held in a fixed location. It will be appreciated that the orbital motion of the wheel relative to the ring may alternatively be accomplished by holding the wheel in a fixed location and moving the ring in an orbital path about the center of the wheel, in which case the ring is permitted to rotate freely about its own axis and the wheel is fixed to be non-rotatable.

Figure 4:
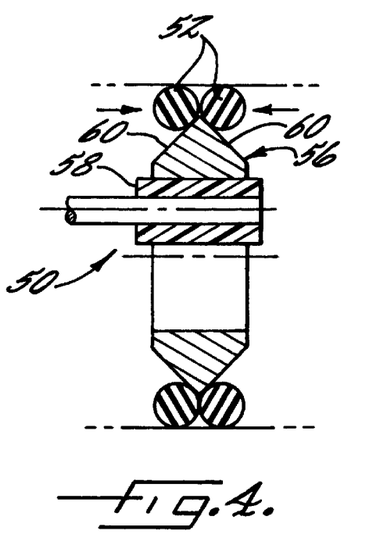
FIG. 4 is a cross-sectional view similar to FIG. 3, showing a first embodiment of a continuously variable hypocyclic drive in accordance with the invention employing movable ring halves, with the drive in a neutral configuration.
Figure 5:
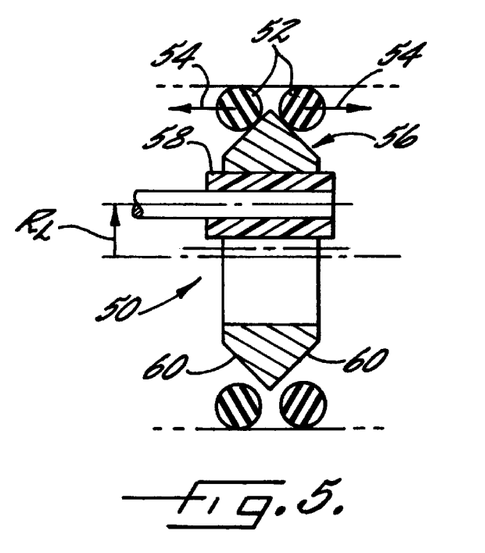
FIG. 5 is a view similar to FIG. 4, showing the drive in a low-ratio position.
Figure 6:
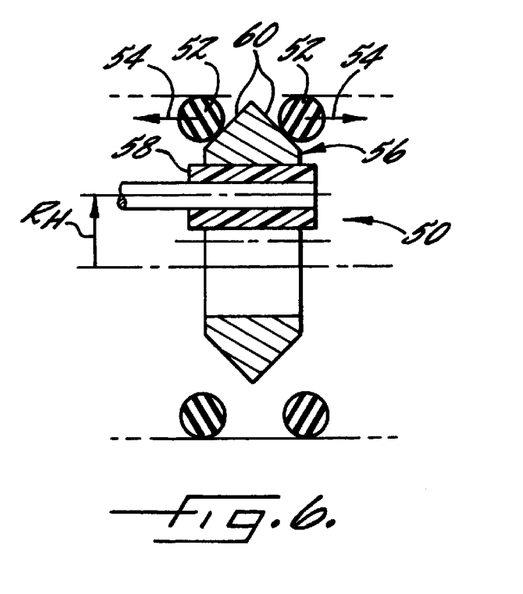
FIG. 6 is a view similar to FIGS. 4 and 5, showing the drive in a high-ratio position.

Another significant advantage of the invention over prior friction drives is that the friction drive of the invention is readily adaptable to provide a continuously variable ratio of input to output speed, while preserving the friction-increasing characteristics of the drive. FIGS. 4–6 depict one embodiment of a hypocyclic friction drive 50 which is adjustable to continuously vary the speed ratio. The friction ring comprises a pair of friction ring portions or halves 52 which are movable toward and away from each other in the direction indicated by arrow 54 by a suitable actuation means (not shown), such as a mechanical linkage, a hydraulic actuator, pneumatic actuator, or the like. A wedged member 56 is urged into contact with the ring halves 52 by a wheel 58 and is forced in an orbital rolling movement around the inner surfaces of the ring halves by the orbiting wheel, as in the previously described embodiment of the invention. The wedged member 56 may have a tapered or wedge-shaped outer surface 60 as shown in FIGS. 4–6, or alternatively or additionally, the ring halves 52 may have angled inner surfaces which converge toward one another in the radially outward direction, so that relative movement of the wedged member radially outward toward the ring halves causes the wedged member to be wedged between the ring halves to increase the frictional grip on the wedged member.

FIG. 4 depicts the friction drive 50 in a neutral configuration in which the ring halves 52 are in contact with the full circumference of the wedged member 56. In this configuration, orbital motion of the wheel 58 does not cause orbital motion or rotation of the wedged member 56. The wheel 58 merely orbits and rolls around the inner surface of the wedged member 56, which is stationary. This represents a "geared neutral" setting of the drive.

FIG. 5 depicts the friction drive 50 in a low-ratio configuration in which the ring halves 52 are moved apart. The mechanism which maintains the wheel 58 in contact with the inner surface of the wedged member 56 is coordinated with the movement of the ring halves so that as the ring halves are moved apart, the wheel 58 is moved radially outward and constantly urges the wedged member 56 against the ring halves 52. The wheel 58 is thus orbitally driven so that its axis circumscribes a circular path of radius $R_L$, and the wedged member 56 orbits and rolls around the inner surfaces of the ring halves.

FIG. 6 depicts the drive in a high-ratio configuration with the ring halves 52 spaced farther apart so that the wheel 58 must be moved outward to the increased radius $R_H$ in order to maintain the wedged member 56 in contact with the ring halves 52. Thus, for the same angular rate of orbital motion of the wheel 58 about the center axis of the ring halves 52, the wedged member 56 does not rotate at all in FIG. 4, rotates about its axis with a relatively low angular rate when the drive is in the configuration of FIG. 5, and rotates with a relatively higher angular rate when the drive is in the configuration of FIG. 5. By making the spacing between the ring halves 52 infinitely adjustable, the ratio of input to output speed of the drive 50 may be infinitely or continuously varied.

Figure 7:
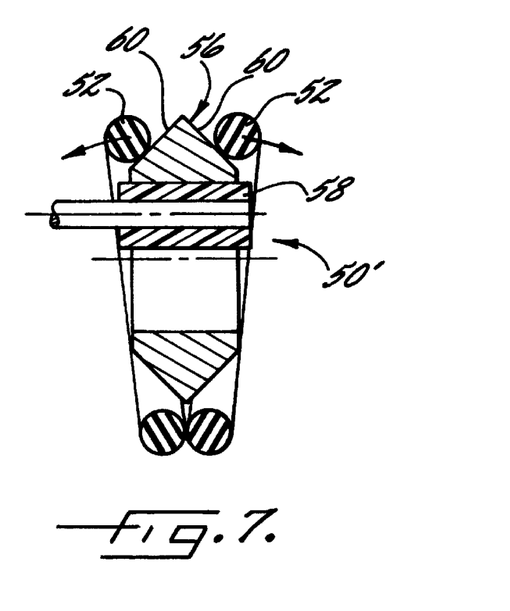
FIG. 7 is a view similar to FIG. 6, showing a second embodiment of a continuously variable hypocyclic drive in accordance with the invention in a high-ratio position in which the ring halves are moved to non-parallel positions.

As suggested above, the ring halves and/or the wedged member may be variously contoured or shaped in order to effect a firm friction-supporting contact therebetween. Alternatively or additionally, FIG. 7 depicts another means of effecting a firm gripping of the wedged member by the ring halves. FIG. 7 is analogous to FIG. 6, showing the friction drive 50' in a high-ratio configuration, except that instead of the ring halves 52 remaining parallel as they are moved apart from each other, the ring halves become non-parallel as they are moved from the neutral position to higher-ratio positions. The converging surfaces of the ring halves may be used to facilitate gripping the wedged member more tightly if the wedged member tends to move to an offset position.

Figure 8:
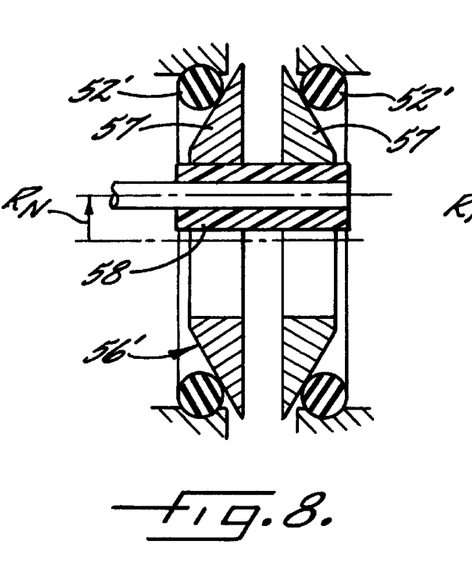
FIG. 8 is a cross-sectional view similar to FIG. 3, showing a third embodiment of a continuously variable hypocyclic drive of the invention employing fixed ring halves and a wedged member with movable surfaces, with the drive in a neutral configuration.
Figure 9:
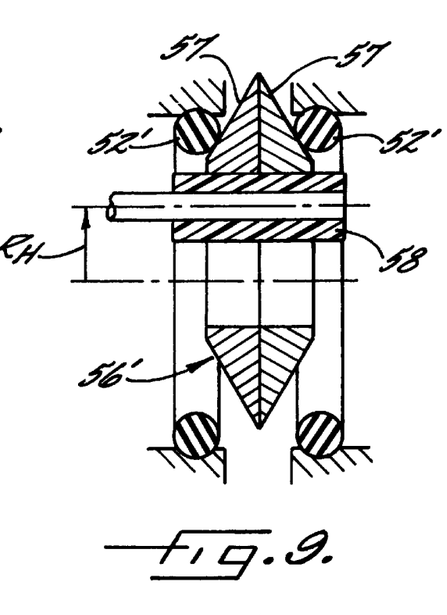
FIG. 9 is a view similar to FIG. 8, showing the drive in a high-ratio configuration.

The invention is not limited to continuously variable friction drives in which ring halves are movable for effecting a change in speed ratio. It will be appreciated that the same effect may be achieved by making the ring portions or halves with a fixed spacing from each other, and providing a wedged member which has movable elements. FIGS. 8 and 9 depict one such embodiment of a friction drive in accordance with the invention. The wedged member 56' comprises two wedge halves 57 which are movable toward and away from each other, and a pair of friction ring portions or halves 52' which are supported at a fixed spacing from each other. The friction ring portions 52' may comprise two discrete rings, or two portions of a one-piece ring, but the term "ring halves" is used for convenience. In FIG. 8, the wedge halves 57 are spaced apart so that the wedged member is concentric with the ring halves 52', thus defining a neutral configuration. In the neutral setting of the drive, the center of the wheel 58 is located at a radius $R_N$ from the center of the friction ring halves 52'. In FIG. 9, the wedge halves 57 are moved closer together so that the wedged member can be moved out to a more-eccentric position with its center at an increased radius $R_H$ from the center of the friction ring halves 52', thus defining a non-neutral configuration.

It will be appreciated that the wedge halves 57 may be movable into non-parallel positions, similar to the ring halves 52 as shown in FIG. 7, in order to facilitate gripping of the wedged member 56' between the ring halves 52'.

Figure 10:
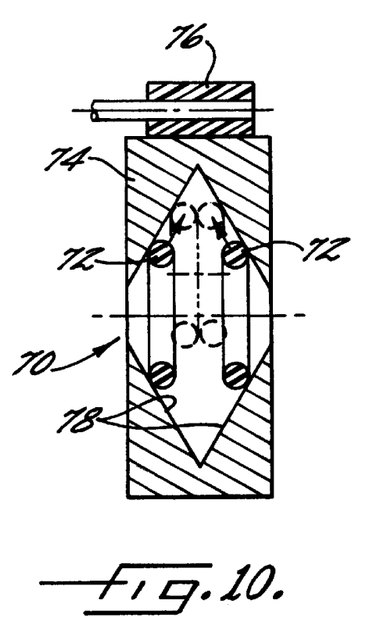
FIG. 10 is a cross-sectional view similar to FIG. 3, showing an epicyclic continuously variable friction drive in accordance with the invention.

Thus far, the description has focused on hypocyclic friction drives. However, the invention is not so limited, and encompasses epicyclic friction drives as well. FIG. 10 depicts an embodiment of an epicyclic friction drive 70 in accordance with the invention. A pair of ring halves 72 are disposed within the inner surface of a wedged member 74, and an orbitally driven rotatable wheel 76 engages the outer surface of the wedged member to urge the wedged member against the ring halves 72. As with the hypocyclic drives, the wheel 76 is orbitally driven about the center of the ring halves 72. The inner surface of the wedged member has angled surfaces 78 which converge toward each other in the radially outward direction. However, alternatively or additionally, the ring halves 72 may include angled surfaces.

Figure 10A:
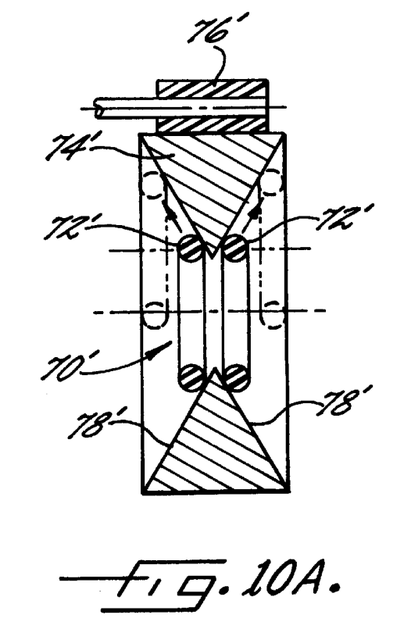
FIG. 10A is a view similar to FIG. 10, showing another embodiment of an epicyclic drive in accordance with the invention.

FIG. 10A depicts a variation on the epicyclic drive of FIG. 10. The drive 70' of FIG. 10A includes a wedged member 74' having inner angled surfaces 78' which converge in the radially inward direction to a minimum-diameter circular surface of the wedged member inner surface. Friction ring halves 72' contact the inner surfaces 78', and the wheel 76' wedges the wedged member 74' against the friction ring halves. In FIGS. 10 and 10A, the friction rings are shown in solid lines in neutral settings of the drives, and are shown in phantom lines in non-neutral settings of the drives. For convenience of illustration, FIGS. 10 and 10A depict the wedged member and wheel as remaining fixed at their respective radial locations and the friction rings as radially moving to effect a change in speed ratio of the drive. However, it will be appreciated that in reality the friction rings remain fixed in their radial locations and the wedged member and wheel are moved to different radial locations with respect to the friction rings.

The epicyclic drives 70 and 70' employ movable ring halves 72 and 72' for effecting continuously variable speed ratio adjustments of the drive. However, as with the hypocyclic drives, the ring halves alternatively may be fixed and the wedged member may include movable elements.

The friction drives described thus far have been drives in which the input and output each have orbital components to their motions. In some instances, it may be desirable to obtain a pure rotational output from a friction drive in accordance with the invention. One way in which this may be accomplished with a friction drive such as those described in connection with FIGS. 1–10 is by coupling the orbitally and rotationally moving output member to an eccentric constant velocity joint such as the one depicted in FIG. 11. The eccentric constant velocity joint 90 comprises a pair of ring gears 92 and 94 having gear teeth on their inner circular surfaces, and a smaller transfer gear 96 having corresponding teeth on its outer surface for meshing with the gear teeth of both ring gears 92 and 94. One of the ring gears 92 and 94, for example ring gear 92, comprises an input gear which is orbitally and rotationally driven. The smaller gear 96 is constrained to remain in contact with and meshed with the gear teeth of both ring gears 92 and 94. The ring gear 94 comprises an output gear which does not orbit, but is rotatable about its axis. Thus, orbital and rotational motion of input ring gear 92 causes the transfer gear 96 to orbit about the center of the input ring gear 92 and to also orbit about the center of the output ring gear 94, as the transfer gear rolls around the inner surfaces of both ring gears. As the transfer gear 96 orbits, it also rotates about its axis.

Figure 11:
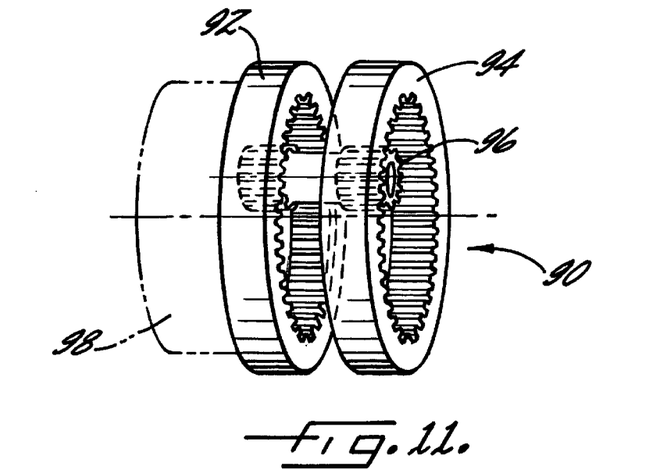
FIG. 11 is a perspective view of an eccentric constant velocity joint suitable for nullifying orbital motion of the wedged member while transmitting its rotational motion.

Advantageously, the toothed circumferences of the input and output gears 92 and 94 are identical in diameter and have identical gear teeth. Accordingly, the input gear 92 is forced to orbit about the center of the output gear 94 and to rotate about its own center, which causes the transfer gear 96 to orbit and roll about the centers of both gears 92 and 94. Because the input and output gears have identical toothed circumferences, the rotational motion of the input ring gear 92 is transmitted by the transfer gear 96 to the output gear 94. The output ring gear 94 may be connected to an output shaft. Thus, the eccentric constant velocity joint 90 nullifies orbital motion of the input ring gear while transmitting its rotational component to the output gear.

Figure 12:
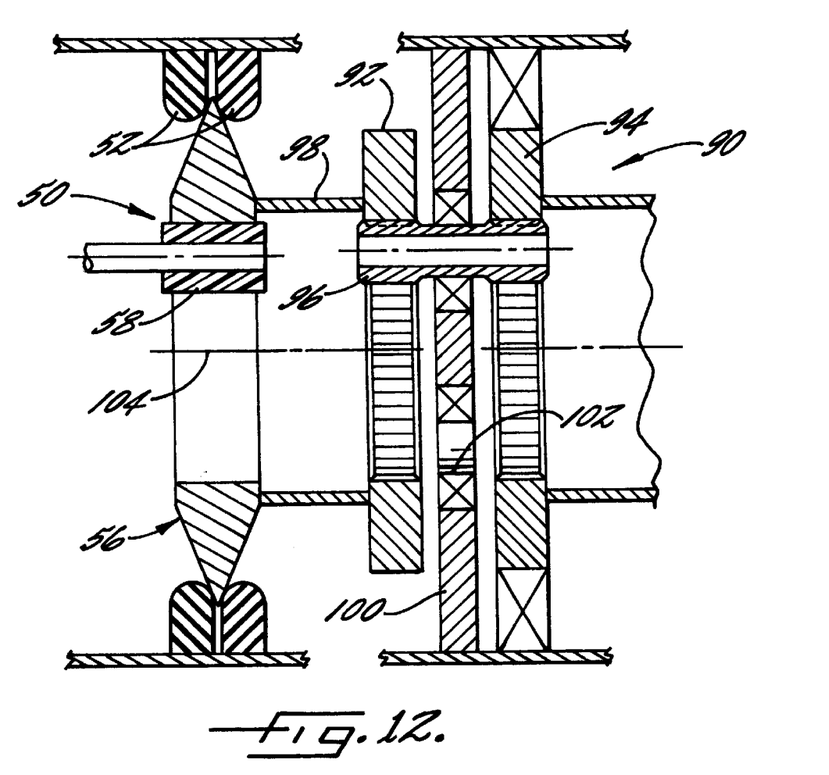
FIG. 12 is a cross-sectional view showing one embodiment of an orbital hypocyclic friction drive coupled to the eccentric constant velocity joint, with the drive in a neutral setting.

For transmitting the rotational motion of the wedged member of any of the orbital friction drives of FIGS. 1–10 while nullifying its orbital motion, the input ring gear 92 may be connected to the wedged member and the output ring gear 94 aligned coaxially with the axis through the center of the friction ring or ring halves of the friction drive. FIG. 12 schematically depicts a hypocyclic continuously variable friction drive 50 of the type described in connection with FIGS. 4–6 connected to the eccentric constant velocity joint 90, with the drive 50 in a neutral setting. The wedged member 56 is connected to the input ring gear 92 by a shaft 98. The wedged member 56 in the neutral setting is coaxial with the friction ring halves 52 and therefore is stationary (not orbiting or rotating), and both ring gears 92 and 94 are coaxial with the ring halves 52 and are stationary. A member 100 located between the ring gears defines an annular raceway 102 for guiding the orbital motion of the transfer gear 96 about the axis of the output ring gear 94 and for maintaining the transfer gear 96 in meshing engagement with the inner toothed surface of the output ring gear 94. Although not shown in FIGS. 12–14, the eccentric constant velocity joint 90 includes means for maintaining the transfer gear 96 in meshing engagement with the inner toothed surface of the input ring gear 92.

Figure 13:
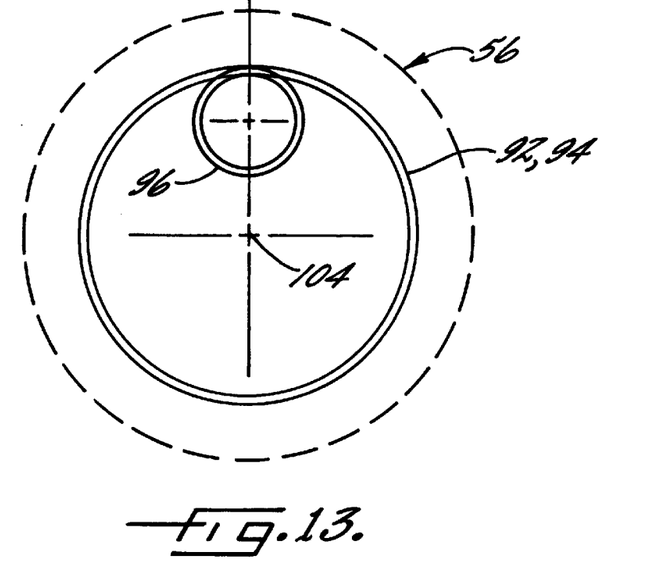
FIG. 13 is a diagrammatic end view of the apparatus of FIG. 12 with the drive in a neutral setting.

FIG. 13 depicts the friction drive and eccentric constant velocity joint in a neutral setting. FIG. 13 is a diagrammatic end view in which the circumference of the wedged member 56 which contacts the ring halves 52, the inner toothed surfaces of the ring gears 92 and 94, and the outer toothed surface of the transfer gear 96 are represented by circles. For clarity, the wheel 58 and ring halves 52 are not shown in FIG. 13, and the wedged member 56 is indicated by a dashed line.

Figure 14:
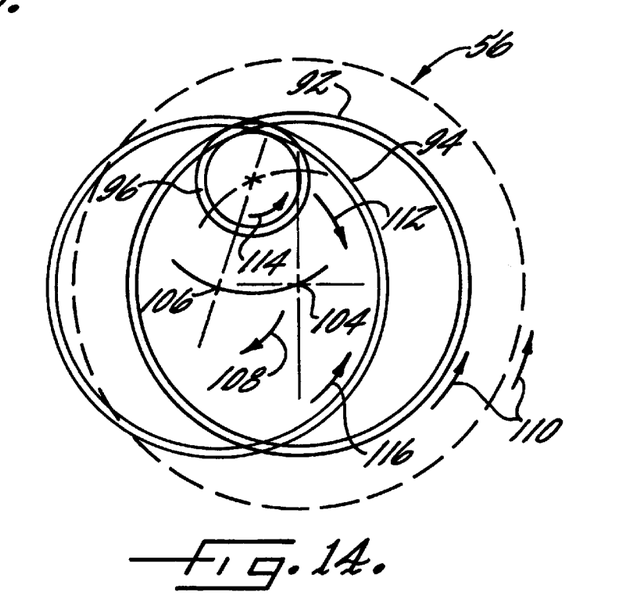
FIG. 14 is a view similar to FIG. 13, showing the drive in a non-neutral setting.

FIG. 14 is a view similar to FIG. 13, showing the apparatus in a non-neutral setting. The center 104 of the wedged member 56 (which also coincides with the center of the input ring gear 92) orbits about the center 106 of the ring halves 52 (which also coincides with the center of the output ring gear 94), as indicated by arrow 108. The wedged member 56 and input ring gear 92 rotate about their common center 104, as indicated by arrows 110. The orbital and rotational motions of the input ring gear 92 cause the transfer gear 96 to orbit and roll about the centers of both ring gears 92 and 94, as indicated by arrows 112 and 114. The rotation 114 of the transfer gear 96 is imparted to the output ring gear 94, as indicated by arrow 116. Thus, the rotational motion of the wedged member 56 is transmitted to the output ring gear 94, but the orbital motion of the wedged member is nullified.

Figure 15:
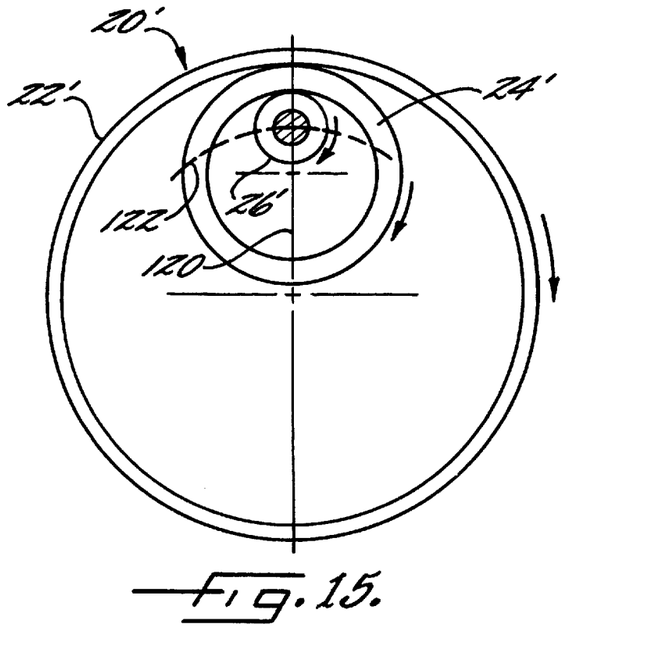
FIG. 15 is a view similar to FIG. 2, showing a non-orbital friction drive in accordance with the invention.

Another way to obtain a pure rotational output motion is to configure the friction drive as a non-orbital drive. This is illustrated in FIG. 15, which shows a non-variable friction drive 20' similar to the friction drive 20 of FIG. 2, except that instead of orbitally driving a freely rotating wheel about the center of a non-rotating friction ring, the wheel 26' does not orbit and is rotatable about its center, and the wedged member 24' does not orbit but is held in an eccentric position relative to the center of the friction ring 22' by the eccentrically located wheel 26', which urges the wedged member 24' against a rotatable friction ring 22'. With this drive, various input-output permutations are possible. The wheel 26' may be rotatably driven about its center, and the friction ring 22' may be freely rotatable about its center. In this case, rotational output may be taken off either the friction ring 22' or the wedged member 24'. Alternatively, the friction ring 22' may be rotatably driven, and output taken off either the wedged member 24' or the wheel 26'. Yet another alternative is to rotatably drive the wedged member 24' and take output off either the friction ring 22' or the wheel 26'. In any case, the wheel 26' is prevented from moving closer to the center of the friction ring 22' and, consequently, any tendency of the wedged member 24' to move its center off the line 120 passing through the centers of the friction ring 22' and the wheel 26' causes a natural friction-increasing effect. The friction-increasing effect occurs because the force tending to move the center of the wedged member 24' off line 120 also creates greater normal forces between the wheel 26' and the wedged member, and between the wedged member and the friction ring 22'. Therefore, the wedged member 24' is gripped more tightly between the wheel and the friction ring whenever the force it must transmit increases. The friction-increasing effect may be enhanced by permitting the wheel 26' to move laterally along an arc 122 (or along a line tangent thereto) of greater radius than the radius of the wheel's center from the center of the friction ring 22', so that the motion of the wheel 26' would effectively move the wheel closer to the friction ring 22'. Alternatively, the friction ring 22' could be permitted to move to accomplish the same relative movement between the wheel 26' and the friction ring 22'.

As with the orbital friction drives described above, the non-orbital friction drives of the invention may be made continuously variable by employing movable ring halves or a wedged member with movable elements. Additionally, the non-orbital friction drives of the invention may be configured as epicyclic drives in which the wheel contacts the outside of the wedged member and the friction ring or ring halves contact the inside of the wedged member, similar to the drive shown in FIG. 10.

Other modifications and variations on the above-described embodiments of the invention are possible. For example, any of the orbital or non-orbital versions of the friction drive may be provided with multiple wedged members and multiple wheels, which is beneficial for providing increased torque capability, and for reducing out-of-balance loads with the orbital versions of the invention.

Additionally, the eccentric constant velocity joint 90 may be employed with non-orbital friction drives of the invention. In this case, the input ring gear 92 would be coupled either to the wedged member or the wheel of the friction drive. The transfer gear 96 of the constant velocity joint would not orbit but would move along the ring gears 92 and 94 as necessary when the ring gear 92 is moved to eccentric positions with respect to the output ring gear 94, and would transmit rotational motion of the input ring gear 92 to the output ring gear 94.

Figure 16:
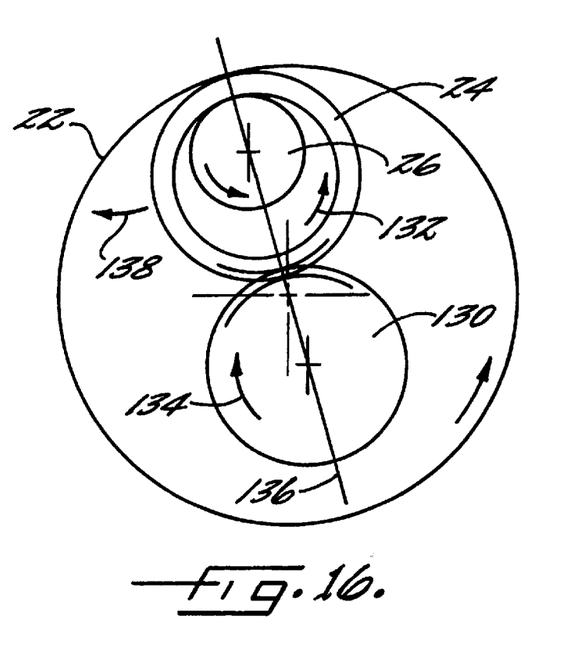
FIG. 16 is a view similar to FIG. 15, showing a non-orbital friction drive of the invention having an output gear.

Various output means may be used with any of the friction drives of the invention for transmitting rotary motion from the drives. However, it should be noted that the output means must be carefully designed not to impair the natural friction-increasing effect of the invention. Furthermore, by careful design of the output means, the friction-increasing effect can be enhanced. For example, FIG. 16 depicts a non-orbital hypocyclic friction drive in accordance with the invention, in which the outer surface of the wedged member 24 is toothed, and a toothed output gear 130 meshes with a circumference of the wedged member. Rotation of the wedged member 24 as indicated by arrow 132 thus causes rotation of the output gear 130 as indicated by arrow 134. The output gear 130 is located with its center on the line 136 that passes through the centers of the friction ring 22 and the wheel 26 and engages the wedged member 24 on the side thereof opposite from the contact point with the friction ring 22. In this position of the output gear, any resistance to rotation of the wedged member 24 imposed by the output gear 130 causes the wedged member to move laterally off the line 136 in a direction which tends to increase the wedging effect of the wedged member between the wheel 26 and the friction ring 22. For example, when the wedged member is rotating in the direction of arrow 132, resistance applied by the output gear 130 causes the wedged member to tend to move in the direction of arrow 138, so that a greater wedging force is applied to the wedged member by the wheel. Conversely, when the wedged member is rotating in a direction opposite to arrow 132, and therefore the output gear 130 is rotating opposite to arrow 134, resistance applied by the output gear causes the wedged member to tend to move in the direction opposite to arrow 138, so that a greater wedging force is again applied to the wedged member by the wheel.

Yet another variation which can be made to the variable friction drives of the invention is to employ tapered surfaces both at the interface between the outside of the wedged member with the friction ring halves (in the hypocyclic version) and at the interface between the inside of the wedged member with the wheel, and to control the contact between the wheel with the inside of the wedged member in such a manner that the wheel can be rotatably driven about its axis in order to cause the wedged member to be frictionally gripped on both its outer and inner surfaces. To explain how this can be accomplished, it is helpful to first explain that for an orbital hypocyclic drive in which the input is the forced orbital motion of the wheel, such as the wheel 58 in FIGS. 4–6, about the center of fixed friction ring halves, the ratio $R_O$ of rotations of the wheel about its center to the orbital rotations of the wheel about the center of the friction ring halves 52 is given by the formula:

$$R_O = BE/DA - 1,$$

where:

B=inside diameter of wedged member defined by contact surface between wedged member and wheel, E=inside diameter of friction ring halves defined by contact surface between friction ring halves and wedged member, D=outside diameter of wedged member defined by contact surface with inside surface of friction ring halves, and A=outside diameter of wheel defined by contact surface with inside surface of wedged member.

For a non-orbiting drive in which the input is the forced rotation of the friction ring halves, the ratio $R_N$ of wheel rotations to friction ring rotations is given by the formula:

$$R_N = BE/DA$$

Thus, in either case, it can be seen that the rotations of the wheel will be at a fixed ratio to the input as long as the factor BE/DA remains constant. Accordingly, by holding this factor constant, the wheel can be forced to rotate about its center at a fixed ratio to the input rotation, facilitating frictionally gripping the wedged member on both its inner and outer surfaces.

Figure 17A:
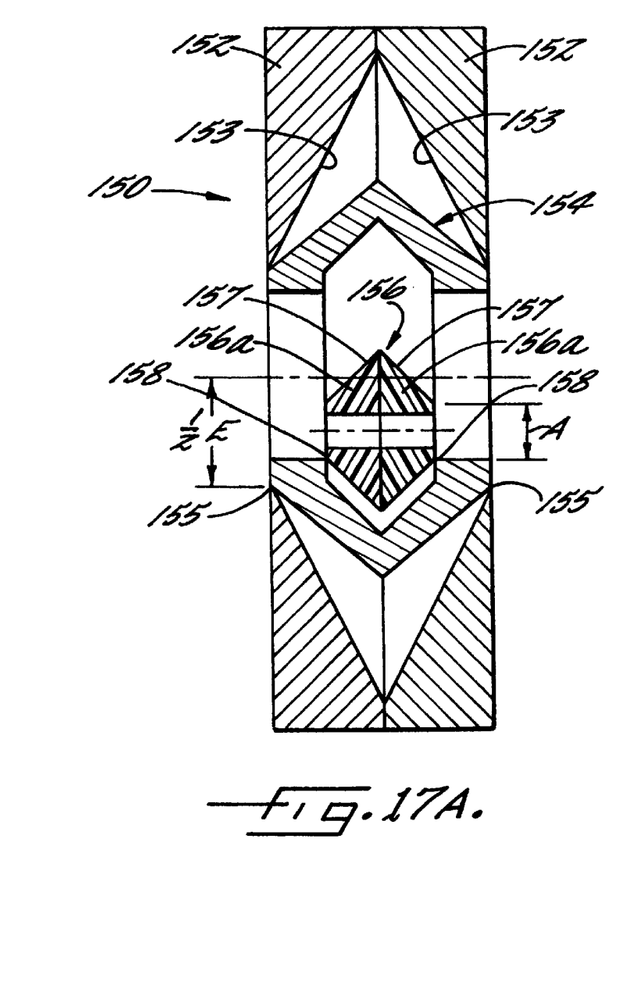
FIGS. 17A and 17B are cross-sectional views of a preferred embodiment of a variable friction drive in accordance with the invention, showing the drive in a neutral and non-neutral setting, respectively.
Figure 17B:
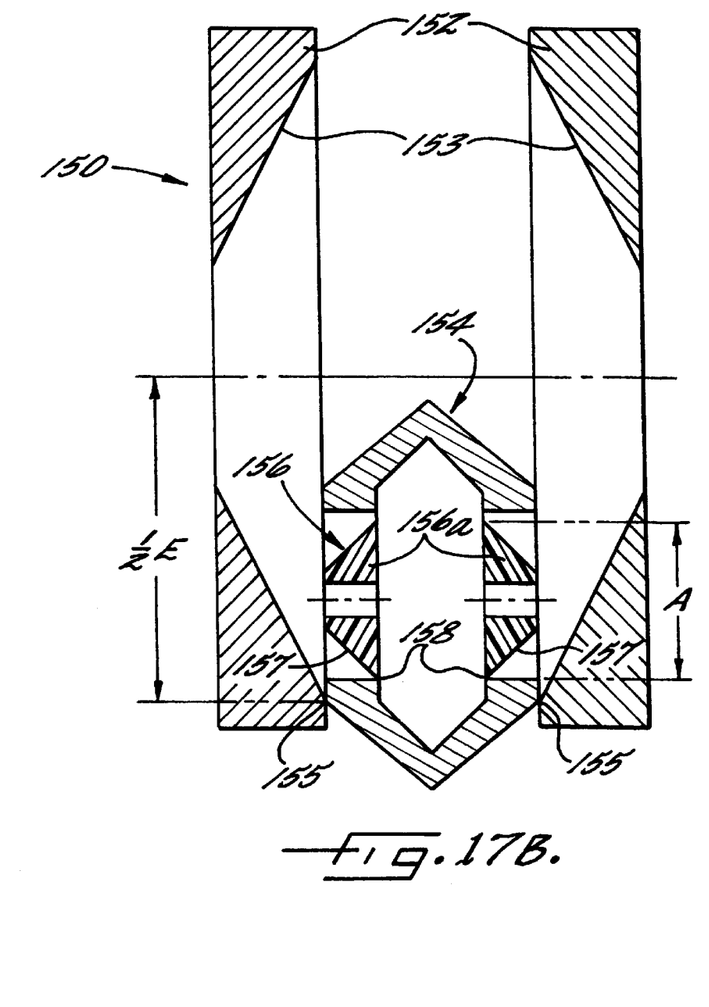

FIGS. 17A and 17B depict one way of accomplishing this result, in which the dimensions of the wedged member (B and D) are held fixed, and the dimensions A and E are varied to keep the ratio therebetween constant. The variable hypocyclic friction drive 150 of FIGS. 17A and 17B includes friction ring halves 152 which are tapered on their inside surfaces 153 and are movable toward and away from each other to vary the spacing therebetween. A wedged member 154 disposed within the ring halves includes outer contact surfaces 55 which contact the tapered inner surfaces 153 of the ring halves. A wheel 156 formed as two wheel halves 156*a* is disposed within the wedged member 154. The wheel halves 156*a* include tapered outer surfaces 157 which contact inner surfaces 158 of the wedged member. FIG. 17A shows the drive in a neutral setting and FIG. 17B shows the drive in a non-neutral setting. In FIG. 17B, the friction ring halves 152 are moved apart, allowing the wedged member 154 to move to an eccentric position, and the wheel halves 156*a* are also moved apart, thus changing the contact position between the wheel halves and the inside of the wedged member, and hence changing the effective outside diameter A of the wheel. The positioning of the ring halves and the wheel halves is coordinated so that the ratio of A to E is held fixed.

Accordingly, where the drive 150 is an orbital drive in which the wheel 156 is orbitally driven about the center of the ring halves at a given orbital input rate, the wheel 156 can also be driven about its axis at a fixed ratio to the input orbital speed such that rotation of the wedged member about its center is imparted both by the frictional engagement of the friction ring halves with the outer surface of the wedged member as the wedged member is forced by the orbiting wheel to roll around the ring halves, and also by the forced rotation of the wheel in contact with the inner surface of the wedged member. Alternatively, where the drive 150 is a non-orbital drive in which the friction ring halves 152 are rotatably driven about their center at a given input speed, the wheel 156 can also be driven about its center at a fixed ratio to the input speed, and again, the wedged member 154 is frictionally gripped and rotated from both its inner and outer surfaces. By coordinating the positioning of the ring halves and wheel halves, this synchronized frictional gripping of the wedged member may be accomplished at the neutral and non-neutral settings at any speed ratio.

Figure 18A:
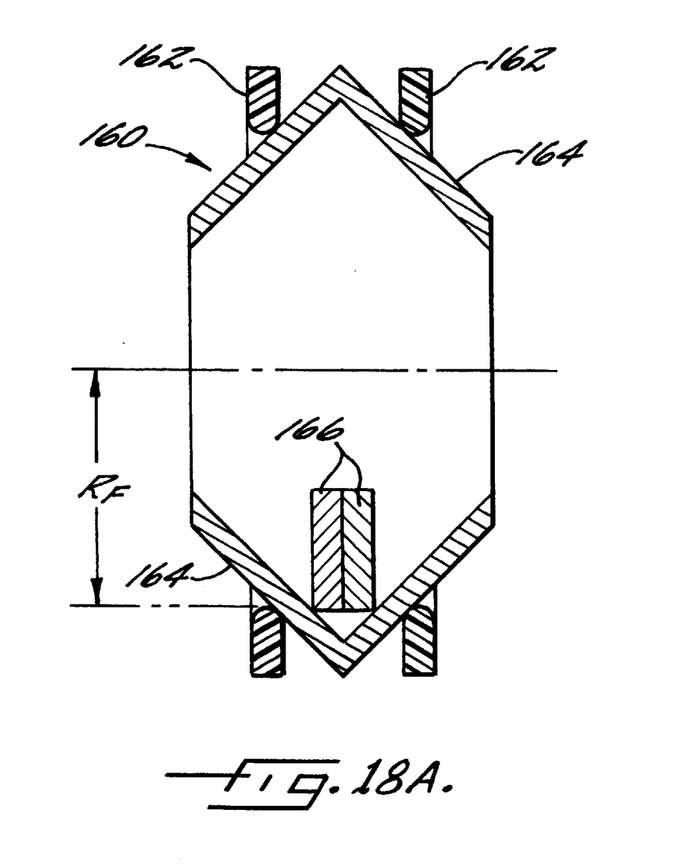
FIGS. 18A and 18B are cross-sectional views of another preferred embodiment of a variable friction drive in accordance with the invention, showing the drive in a neutral and non-neutral setting, respectively.
Figure 18B:
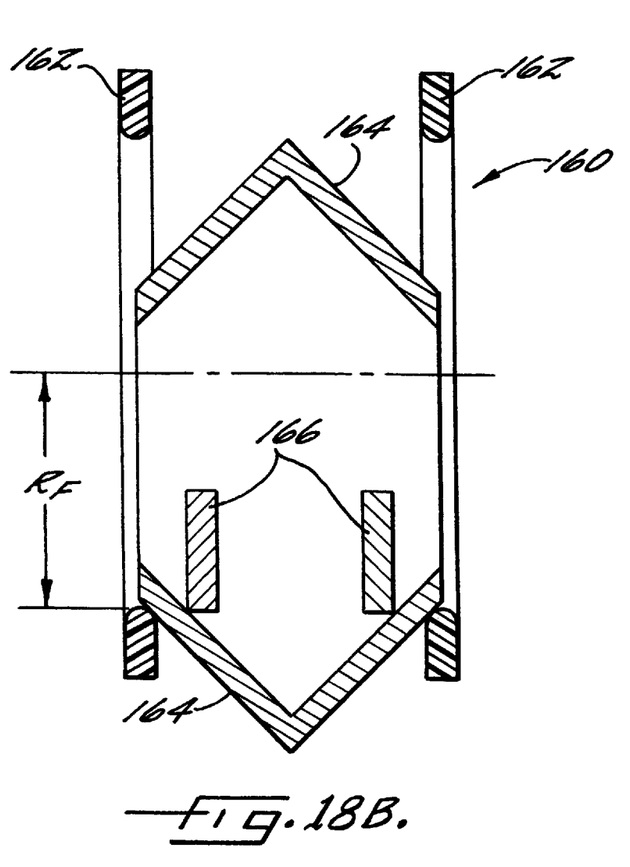

FIGS. 18A and 18B illustrate another way of accomplishing this result with a drive 160 in which the contact points between the inner surfaces of the friction rings halves 162 and the outer surface of the wedged member 164, and the contact points between the wheel halves 166 and the inner surface of the wedged member 164 are always at a fixed radius $R_F$ from the center of the friction ring halves 162. Therefore, B=D, and A and E have a fixed ratio to each other. In this manner, for any speed ratio setting of the drive, the wheel can be rotatably driven about its axis at a fixed speed ratio relative to the input speed, and therefore the wedged member is frictionally gripped on its inner surface by the wheel halves and on its outer surface by the friction ring halves.

Figure 19:
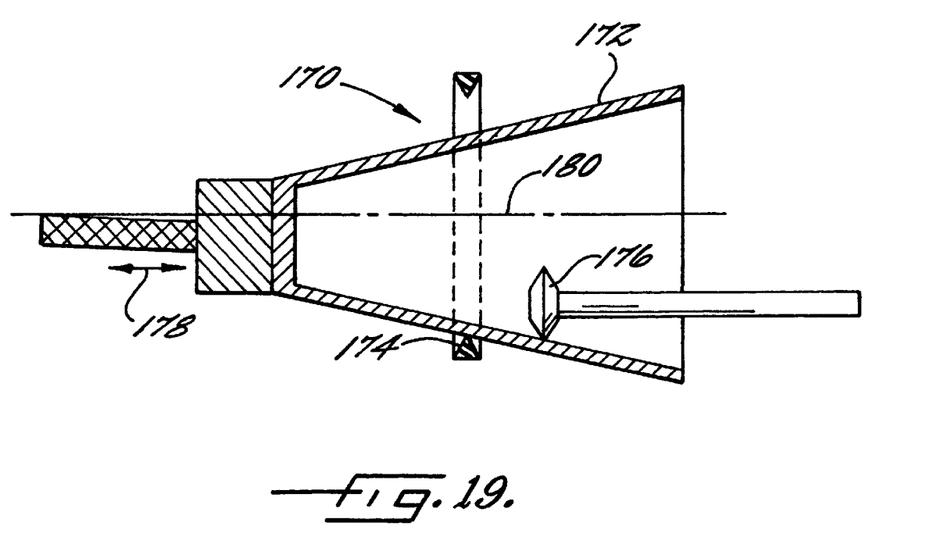
FIG. 19 is a longitudinal cross-sectional view of still another preferred embodiment of a variable friction drive in accordance with the invention.

The continuously variable drives described thus far have employed one or more members split into halves which are axially movable toward and away from each other. However, the invention is not limited to drives having such split members. For example, FIG. 19 depicts a continuously variable hypocyclic drive 170 which includes a tapered or conical wedged member 172 the outer surface of which is held in contact with the inner surface of a friction ring 174 by a wheel 176 which is in contact with the inner surface of the wedged member. The wedged member 172 is axially movable in either direction, as indicated by arrow 178 (or alternatively, the friction ring and wheel are axially movable). Axial movement of the wedged member 172 effectively changes the diameter of the contact surface between the outer surface of the wedged member and the friction ring 174. Thus, it will be appreciated that a ratio of input speed to output speed may be effected by moving the wedged member relative to the friction ring and wheel. The drive 170 may be an orbital drive, in which case the wheel 176 may be orbitally driven about the axis 180. Alternatively, the drive may be a non-orbital drive, in which case the wheel may be rotatably driven about its own center.

The drive 170 may further be configured to permit frictional driving of the wedged member on both its inner and outer surfaces, as previously described. For example, the drive 170 depicted in FIG. 19 has the outer contact surface of the wedged member in contact with the friction ring equal in diameter to the inner contact surface of the wedged member in contact with the wheel, that is, B is equal to D.

Further, the contact surface of the wheel, A, and the contact surface of the friction ring, E, both have fixed diameters. Thus, the wheel 176 may be rotatably driven about its center at a fixed ratio to an input, such as the orbital motion of the wheel or, alternatively, the rotational motion of the friction ring 174, such that the wedged member 172 is frictionally driven on both of its inner and outer surfaces.

Persons of ordinary skill in the art will readily comprehend other modifications and variations of the above-described embodiments within the scope of the invention. Accordingly, the scope of the invention is not limited to the particular illustrative embodiments described herein, but is defined by the appended claims.

What is claimed is:

1. A friction drive for transmitting rotary power, comprising three mutually eccentric members including:

a ring having a circular surface;

a wedged member having concentric inner and outer circular surfaces and being rotatable about a center thereof; and a wheel disposed eccentric relative to the ring and having a circular outer surface biased against one of the inner and outer surfaces of the wedged member to force the other of the inner and outer surfaces of the wedged member into contact with the circular surface of the ring, the center of the wedged member lying generally on a line passing through the centers of the ring and the wheel;

one of the three members being an input member which is adapted to be rotatably or orbitally driven relative to the other two members so as to cause at least one of the other two members comprising an output member to rotate about the center thereof, and the wedged member being movable relative to the wheel and the ring such that the center of the wedged member can move off the line through the centers of the ring and the wheel to cause the wedged member to be gripped between the ring and the wheel with a greater force, the wheel, wedged member, and ring being substantially inflexible.

2. The friction drive of claim 1 wherein the wheel is in contact with the inner circular surface of the wedged member and the circular surface of the ring comprises an inner surface thereof, and the outer surface of the wedged member is in contact with the inner surface of the ring.

3. The friction drive of claim 1, further comprising at least one additional wedged member and an additional wheel associated therewith, the wheels being angularly spaced apart from one another about the center of the ring.

4. The friction drive of claim 1 wherein the wheel is in contact with the outer circular surface of the wedged member and the circular surface of the ring comprises an outer surface thereof, and the inner surface of the wedged member is in contact with the outer surface of the ring.

5. The friction drive of claim 1 wherein the ring is fixed and non-rotatable and the wheel is orbitally driven about the center of the ring, the wheel rolling along said one of the inner and outer surfaces of the wedged member and causing the wedged member to orbit about the center of the ring and to roll along the circular surface of the ring.

6. The friction drive of claim 5 wherein the wheel is forced to rotate about its center at a rotational rate which is synchronized with the rate of orbital motion of the wheel about the center of the ring, such that both the inner and outer surfaces of the wedged member are frictionally gripped.

7. The friction drive of claim 1 wherein the wheel is non-rotatable and non-orbital and the ring is orbitally driven about the center of the wheel, the ring freely rotating about the center thereof, the wedged member being forced by the orbiting ring to orbit and roll about the wheel.

8. The friction drive of claim 7 wherein the ring is forced to rotate about the center thereof at a rotational rate which is synchronized with the rate of orbital motion of the ring about the center of the wheel, such that both the inner and outer surfaces of the wedged member are frictionally gripped.

9. The friction drive of claim 1 wherein the three members are non-orbital relative to one another and are rotatable about the respective centers thereof, and one of the members comprises an input member forced to rotate about the center thereof.

10. The friction drive of claim 9 wherein both the wheel and the ring are forced to rotate about the respective centers thereof in synchronism with each other, such that the wedged member is frictionally gripped on both the inner and outer surfaces thereof.

11. The friction drive of claim 1 wherein the wheel and wedged member orbit relative to the center of the ring and rotate about their respective centers, and further comprising an eccentric constant velocity joint for nullifying orbital motion of the wedged member while transmitting rotational motion thereof, the eccentric constant velocity joint comprising:
  a first ring gear connected with the wedged member so as to orbit and rotate therewith, the first ring gear having a toothed circumference;
  a second ring gear fixed relative to the ring and having a toothed circumference which is identical with that of the first ring gear; and
  a transfer gear having a toothed outer circumference which simultaneously meshes with the toothed circumferences of both ring gears, the transfer gear being rotatable about the center thereof and constrained to orbit about the centers of both ring gears, the transfer gear transmitting the rotational motion of the first ring gear to the second ring gear while not transmitting the orbital motion of the first ring gear.

12. The friction drive of claim 11 wherein the toothed circumferences of the ring gears comprise inner circumferences thereof, and the transfer gear engages the inner circumferences of the ring gears.

13. The friction drive of claim 11 wherein the toothed circumferences of the ring gears comprise outer circumferences thereof, and the transfer gear engages the outer circumferences of the ring gears.

14. The friction drive of claim 1 wherein the wedged member includes a circumference, and further comprising a rotatable output member rotatably driven by rolling contact with the circumference of the wedged member, the center of the wedged member lying generally between the center of the wheel and the center of the rotatable output member such that torque transmitted between the wedged member and the rotatable output member tends to move the center of the wedged member off the line between the center of the ring and the center of the wheel so as to increase the grip on the wedged member.

15. The friction drive of claim 1 wherein a first of the three members includes tapered surfaces for contacting a second of the members, and the first and second members are movable relative to one another for varying an effective diameter of a contact surface of one of the members so as to vary relative rotational speeds of the rotating members of the friction drive.

16. The friction drive of claim 15 wherein at least one of the three members comprises a pair of circular movable members coaxially located side-by-side and movable toward and away from each other, and at least one of the members includes tapered surfaces, the movable members and tapered surfaces coacting to vary the diameter of a contact surface on the movable members.

17. The friction drive of claim 16 wherein the ring comprises a pair of spaced-apart ring halves which are movable to vary the spacing therebetween, and one or both of the wedged member and ring halves include tapered surfaces for varying the effective diameter of the contact surface between the wedged member and the ring halves, the eccentricity of the wheel being varied in accordance with the spacing of the ring halves so that the wheel maintains the wedged member in contact with the ring halves, variation of the spacing between the ring halves thereby permitting continuous variation in the ratio of output rotational speed to input rotational speed.

18. The friction drive of claim 16 wherein the movable members are movable from a minimum spacing to a maximum spacing therebetween for varying a speed ratio of the drive, and wherein the movable members are movable into non-parallel positions relative to each other to facilitate frictional gripping of the wedged member between the ring and the wheel.

19. The friction drive of claim 16 wherein the wedged member comprises a pair of spaced-apart movable members and the ring comprises a pair of spaced-apart ring halves.

20. The friction drive of claim 16 wherein the wheel comprises a pair of wheel halves which are axially movable toward and away from each other, and one or both of the wheel and wedged member includes tapered surfaces coacting with the movable wheel halves for varying an effective diameter of the wheel.

21. The friction drive of claim 15 wherein contact surfaces on both inner and outer surfaces of the wedged member are defined by movable members coacting with tapered surfaces, and wherein the movable members are synchronously moved to permit the wedged member to be frictionally driven on both inner and outer surfaces thereof.

22. A continuously variable friction drive comprising:
  a pair of friction rings arranged coaxially and spaced apart along a common axis, the spacing between the friction rings being continuously variable;
  a wedged member having concentric inner and outer circular surfaces with the outer surface contacting inner surfaces of the friction rings; and
  a wheel disposed eccentric relative to the friction rings and having a circular outer surface biased against the inner surface of the wedged member to force the outer surface of the wedged member into contact with the inner surfaces of the friction rings, the center of the wedged member lying generally on a line passing through the centers of the friction rings and the wheel;
  one of the friction rings and wheel being rotatably or orbitally driven relative to the other to cause the wedged member to undergo a relative rolling motion along the inner surfaces of the friction rings, resulting rotation of the wedged member about the center thereof comprising an output of the drive, the wedged member being movable relative to the wheel and the friction rings such that the center of the wedged member can move off the line passing through centers of the wheel and friction rings to cause the wedged member to be gripped between the friction rings and the wheel with a greater force, a ratio of output speed to input speed being continuously variable by continuously varying the spacing between the friction rings and the eccentricity of the wheel relative to the friction rings so as to continuously vary the effective diameter of the wedged member.

23. The variable friction drive of claim 22 wherein at least one of the friction ring inner surfaces and the wedged member outer surface include tapered surfaces for effectively varying the diameter of a contact surface of the wedged member with the friction rings as the spacing between the friction rings is varied.

24. A method of converting a rotary input motion into a rotary output motion, comprising:

providing three members including a wedged member having a wall which defines inner and outer concentric circumferences, a wheel, and a ring having a circular surface;

gripping the wall of the wedged member between the wheel and the circular surface of the ring, the wheel being eccentric relative to the wedged member and in contact with one of the inner and outer circumferences thereof, the ring being eccentric relative to the wedged member and in contact with the other of the inner and outer circumferences thereof, a center of the wedged member lying generally on a line passing through the centers of the ring and the wheel;

moving a first of the three members in a rotatable or orbital motion relative to the other two members so as to cause a second of the members to move in a rotary motion relative to the first member and to a third of the members, including a rotational motion of the second member about the center thereof, rotational motion being transmitted by rotation of the wedged member; and permitting the center of the wedged member to move off the line through the centers of the ring and the wheel so as to cause the wedged member to be gripped with greater force between the wheel and the ring and thereby reduce tendency of the wedged member to slip relative to the other two members.

25. The method of claim 24 wherein the step of moving a first of the members comprises moving one of the wheel and the ring in an orbital motion about the center of the other of the wheel and the ring, said one of the wheel and ring causing the wedged member to orbit about the center of said other of the wheel and ring and to roll along the circular surface of the ring.

26. The method of claim 24 wherein the step of moving a first of the members comprises driving the first member to rotate about the center thereof, the second and third members being forced to rotate about the respective centers thereof by the rotation of the first member.

27. The method of claim 24 wherein the step of providing three members comprises providing one of the members with tapered surfaces which are in contact with another of the members, and further comprising the step of varying relative rotational speeds of the members by relatively moving said another of the members along the tapered surfaces so as to vary an effective diameter of a contact surface between said one member and said another member.

28. The method of claim 24 wherein the step of providing three members further comprises providing at least one of the members in the form of two coaxial halves which are movable toward and away from each other, and further including the step of varying a spacing between the two halves so as to vary an effective diameter of a contact surface between the two halves and another of the members.

* * * * *